(12) United States Patent
Rivas

(10) Patent No.: US 9,656,808 B2
(45) Date of Patent: May 23, 2017

(54) GRIP TOOL

(71) Applicant: Victor A Rivas, Mandan, ND (US)

(72) Inventor: Victor A Rivas, Mandan, ND (US)

( * ) Notice: Subject to any disclaimer, the term of this patent is extended or adjusted under 35 U.S.C. 154(b) by 0 days.

(21) Appl. No.: 15/156,275

(22) Filed: May 16, 2016

(65) Prior Publication Data

US 2016/0332818 A1 Nov. 17, 2016

Related U.S. Application Data

(60) Provisional application No. 62/161,659, filed on May 14, 2015.

(51) Int. Cl.
*B25B 9/00* (2006.01)
*B66C 1/00* (2006.01)
*B65G 7/12* (2006.01)

(52) U.S. Cl.
CPC ........ *B65G 7/12* (2013.01); *B65G 2201/0276* (2013.01)

(58) Field of Classification Search
CPC .............. B65G 2201/0276; B65G 7/12; E01H 2001/1293; A01K 23/005; B25B 9/00
See application file for complete search history.

(56) References Cited

U.S. PATENT DOCUMENTS

| | | | | | |
|---|---|---|---|---|---|
| 3,738,697 A | * | 6/1973 | Kahan | ................... | B65D 75/22 294/1.4 |
| 4,005,897 A | * | 2/1977 | Smith | .................... | A01K 97/14 294/115 |
| 4,225,174 A | * | 9/1980 | Hennessy | .................. | B25J 1/04 294/1.4 |
| 4,247,139 A | * | 1/1981 | Grieb | .................... | E01H 1/1206 294/1.4 |
| 5,056,842 A | * | 10/1991 | Lindenberg | ........... | E01H 1/1206 294/1.4 |

* cited by examiner

*Primary Examiner* — Stephen Vu
(74) *Attorney, Agent, or Firm* — Symbus Law Group, LLC; Clifford D. Hyra

(57) ABSTRACT

A tool (for gripping an object (e.g., a cylindrical object)) includes: an outer handle; a tubular neck having a proximal end connected to the outer handle; a linkage assembly having first and second ends connected to a distal end of the neck; an inner handle; a connecting rod having a proximal end connected to the inner handle and a distal end connected to a middle portion of the linkage assembly, partially disposed substantially coaxially within the neck thereby nesting the inner handle within the outer handle; and first and second claws attached to the linkage assembly, each claw having a compression surface (e.g., a concave cylindrical surface) configured to conform as a substantial complement to a portion of an outer surface of the to-be-gripped object (e.g., the to-be-gripped cylindrical object).

17 Claims, 30 Drawing Sheets

GRIP TOOL

This application claims the benefit of U.S. Provisional Patent Application No. 62/161,659, filed May 14, 2015, which is hereby incorporated by reference in its entirety.

FIELD OF THE DISCLOSURE

Embodiments of the present invention relate to a tool for gripping a cylindrical object.

BACKGROUND

There are industries whose infrastructure includes cylindrical objects (e.g., pipes, tubes and/or rods), and whose activities include at least some (if not extensive) handheld manipulation of such objects. Such industries include: pipe, tube and/or rod manufacture and distribution; irrigation; the oil & gas industry; plumbing; metal fabrication; etc.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a tool for gripping an object (e.g., a cylindrical object having a diameter D1), the tool comprising: an outer handle; a tubular neck having a proximal end connected to the outer handle; a linkage assembly having first and second ends connected to a distal end of the neck; an inner handle; a connecting rod having a proximal end connected to the inner handle and a distal end connected to a middle portion of the linkage assembly, partially disposed substantially coaxially within the neck thereby nesting the inner handle within the outer handle; first and second claws attached to the linkage assembly, each claw having a compression surface (e.g., a concave cylindrical surface) configured to conform as a substantial complement to a portion of an outer surface of the to-be-gripped object (e.g., the to-be-gripped cylindrical object).

The tool may further include a biasing spring disposed concentrically about the connecting rod and having a first end and a second end, the first end abutting spring-stop flanges inside the tubular neck and the second end abutting the yoke, such that the biasing spring pushes the yoke axially away from the spring-stop flanges and thereby biases the tool into a substantially closed position. The tool may further include a yoke slot in the tubular neck, the yoke slot comprising parallel slots on opposite sides of the tubular neck positioned such that the yoke can move along the slot when forced by motion of the connecting rod. Each combination of claw, corresponding u-shaped frame and corresponding coupling flange may make up a claw assembly, where the u-shaped frames are connected to the tubular neck by a first removable connecting pin and where each coupling flange is connected to one of the second connecting members by a second removable connecting pin. Additional claw assembly having differently-sized claws for accommodating differently-sized objects to be carried may be interchanged by removing the first and second connecting pins from a first claw assembly and inserting the first and second connecting pins into a second claw assembly and the tubular neck and second connecting members, respectively.

In another aspect of the present invention, the linkage assembly includes: a yoke having a first end, a second end, and a middle portion connected to the distal end of the connecting rod, first and second arcuate connecting members having first ends connected to the first and second ends of the yoke, respectively, and first and second y-shaped frames representing the first and second ends of the linkage assembly and each connected at a first end to a corresponding one of the arcuate connecting members, at a second end to the tubular neck, and on a bottom side to corresponding one of the first and second claws.

Another aspect of the present invention, for such a tool (vis-a-vis a to-be-gripped cylindrical object), provides the following: each of the claws has substantially parallel first axial edges that are distal to the linkage assembly, there being a distance D2 between the first axial edges; and the first and second claws are disposable through a range of positions relative to one another via relative coaxial movement between the connecting rod and the tubular neck and consequential articulation of the linkage assembly, the range of positions including: at least one closed position in which the D2<D1 (where, again, D1 is the diameter of the cylindrical object); and at least one substantially open position in which D1<D2.

Another aspect of the present invention, for such a tool (vis-a-vis a to-be-gripped object), provides the following: the object has a dimension D1; each of the claws has substantially parallel first edges that are distal to the linkage assembly, there being a distance D2 between the first edges of the two claws; and the first and second claws are disposable through a range of positions relative to one another via relative coaxial movement between the connecting rod and the neck and consequential articulation of the linkage assembly, the range of positions including: at least one closed position in which the D2<D1; and at least one substantially open position in which D1<D2.

Another aspect of the present invention, for such a tool (vis-a-vis a to-be-gripped cylindrical object) in which there is a diameter D4 representing a maximum diameter of a cylindrical volume defined between the first and second claws when the first and second claws are disposed in a most closed position, additionally provides: first and second shim assemblies removably mounted against the interior surfaces of the first and second claws, respectively, and configured to define a diameter D5 representing a maximum diameter of a cylindrical volume defined between the first and second shim assemblies when the first and second claws are disposed in a most closed position; and D5<D4 such that the tool is better configured to accommodate a smaller diameter cylindrical object when the first and second shim assemblies are mounted thereto, and such that the tool is better configured to accommodate a larger diameter cylindrical object when the first and second shim assemblies are not mounted thereto.

Another aspect of the present invention, for such a tool (vis-a-vis a to-be-gripped object), provides that the tool further comprises first and second shim assemblies removably mounted against interior surfaces of the first and second claws, respectively, which act to increase the effective thickness of the first and second claws to accommodate smaller objects between the claws. The first and second shim assemblies may be concentric with the first and second claws, respectively. The first and second shim assemblies may have even thickness along their entire lengths.

An aspect of the present invention provides a method, which involves: moving the inner handle toward the outer handle, thereby opening the claws; inserting an object between the claws; moving the inner handle back towards the linkage assembly and away from the outer handle, thereby closing the claws around the object; grasping the outer handle of the grip tool; and lifting the grip tool together with the object. Moving the inner handle toward the outer handle may include grasping the grip tool so that a proximal end of a user's palm is disposed against the outer handle and a crook of the user's hand is disposed partially around the outer handle, and so that at least the distal phalanges of the fingers partially wrap around the inner handle, and clenching the user's fingers as if attempting to make a fist, drawing the inner handle away from the linkage assembly and towards a portion of the outer handle against which the proximal end of the user's palm is disposed, thereby opening the claws and transitioning the grip tool from a substantially closed state into a substantially open state. Moving the inner handle back towards the linkage assembly and away from the outer handle may include relaxing the user's fingers and allowing the inner handle to move back towards the linkage assembly and away from the portion of the outer handle against which the proximal end of the user's palm is disposed.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein.

DETAILED DESCRIPTION

Figure 1A:
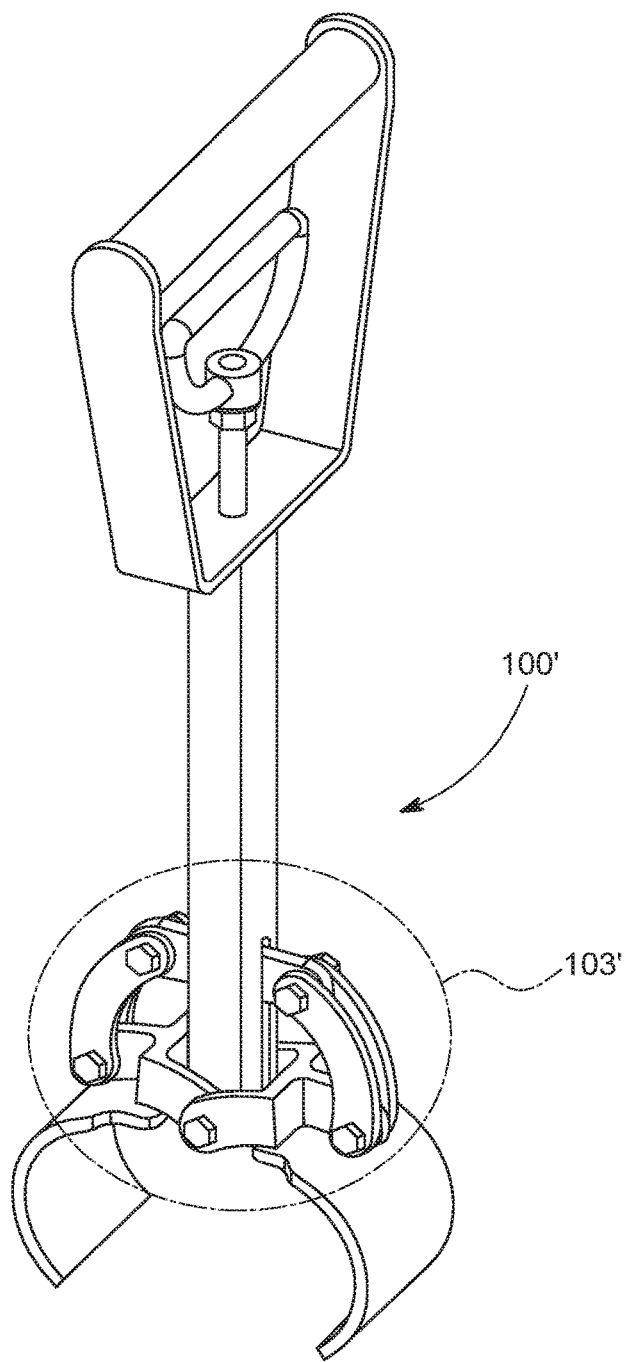
FIG. 1A is a three-quarter perspective view illustrating a tool for gripping an object (e.g., a cylindrical object), according to an embodiment of the present invention.

Embodiments of the present invention will now be disclosed in terms of various exemplary embodiments. This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

In developing embodiments of he present invention, among other things, the inventors thereof:

realized that, in industries (e.g., the oil & gas industry) whose work-flows include at least some (if not extensive) handheld manipulation of objects (for example, cylindrical objects (e.g., pipes, tubes and/or rods)), often the circumferences of such objects are sufficiently large as to be challenging, if not difficult, for a typical human to grasp with one hand; and realized that, even if such objects are of a sufficiently small circumference to be grasped with one hand, often such objects are sufficiently heavy that fatigue significantly impairs the handheld manipulation of such objects and thus significantly negatively impacts the work-flows of such industries;

realized that, for cylindrical objects of the same overall weight, the human hand fatigues more quickly grasping larger circumference cylindrical objects than grasping smaller circumference cylindrical objects; and realized that a tool (for gripping a cylindrical object) which provides features that include:
1. a handle (to be grasped by one hand of a user) in the form of a smaller circumference cylindrical object; and
2. a mechanical grasping arrangement to accommodate a relatively larger circumference cylindrical object; is a tool whose use will delay (relative to barehanded grasping of the larger circumference cylindrical object) the onset of grasping-fatigue experienced by the user.

One or more embodiments of the present invention provide such a tool. Moreover, such a tool can provide additional ergonomic benefits including:

for example, moving the user's hand (in particular, fingers) away from direct contact with such objects that otherwise would be directly grasped, thereby lessening the likelihood of suffering, e.g., crush/compression injuries that can be caused when multiple such objects are moved while in close proximity to each other;

for example, lessening the amount of bending otherwise required of a user who would grasp and carry such objects, thereby facilitating better posture by which to tolerate the weight-bearing stresses of carrying such objects, and thereby lessening back pain; etc.

It should be noted that wherever a cylinder is mentioned, a similar shape such as a prismatic ellipsoid can be substituted with similar, or even improved result. Thus the grip tool may have handles having elliptical prism shapes, and the object to be gripped may similarly (though not necessarily) be an elliptical prism, and the claws may each be shaped as a segment of a hollow elliptical prism (particularly in the case where the object to be gripped is an elliptical prism). Elliptical prism-shaped handles may be preferable ergonomically to cylinders depending on user's anatomies. Irregular shapes are also envisioned, for example handles having textured surfaces, valleys for receiving individual user fingers, slopes on upper and/or lower surfaces or other indications to aid a user in grasping a handle towards its center, etc. A handle might have a cylindrical shape on its top half and the shape of a pentagonal prism on the bottom half, or any other similar variation. Claws may have any shape substantially conforming to an object to be carried.

FIG. 1A is a three-quarter perspective view illustrating a tool ("grip tool") 100' for gripping an object (e.g., a cylindrical object) (not illustrated), according to an embodiment of the present invention.

In FIG. 1A, grip tool 100' is illustrated in an open (substantially) state. Grip tool 100' includes, among other things, a linkage assembly 103' (discussed below in contrast to a linkage assembly 103 of FIG. 1D).

Figure 1B:
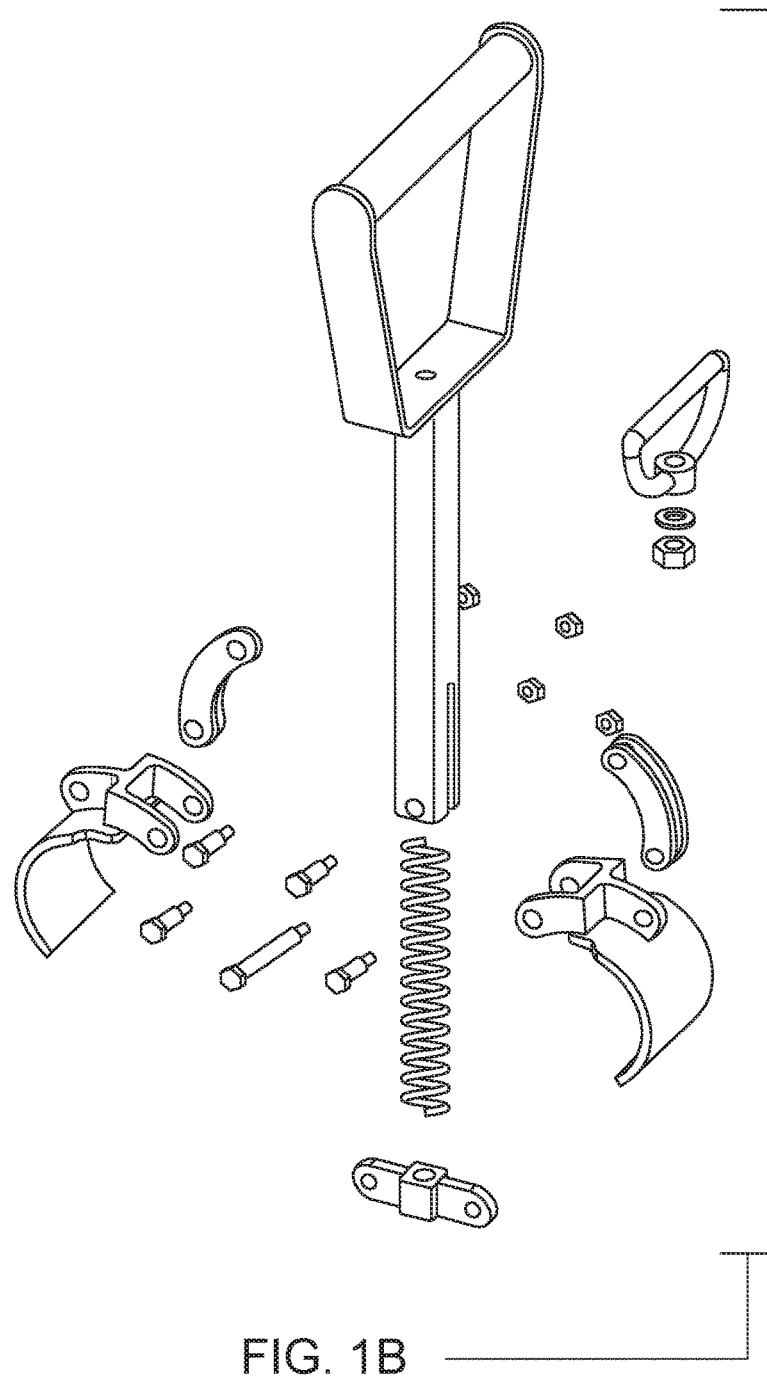
FIGS. 1B-1C are three-quarter perspective, exploded views illustrating the tool of FIG. 1A.
Figure 1C:
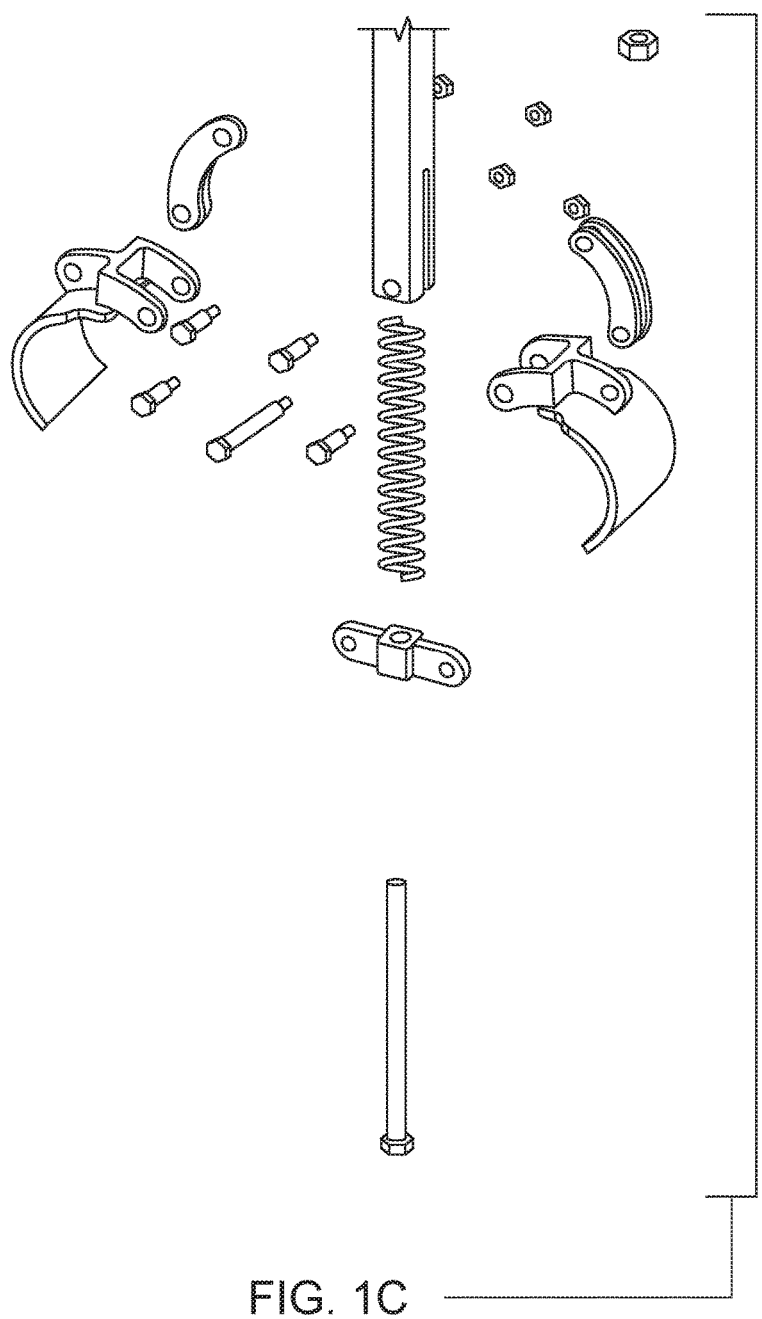

FIGS. 1B-1C are three-quarter perspective, exploded views illustrating grip tool 100' of FIG. 1A.

Figure 1D:
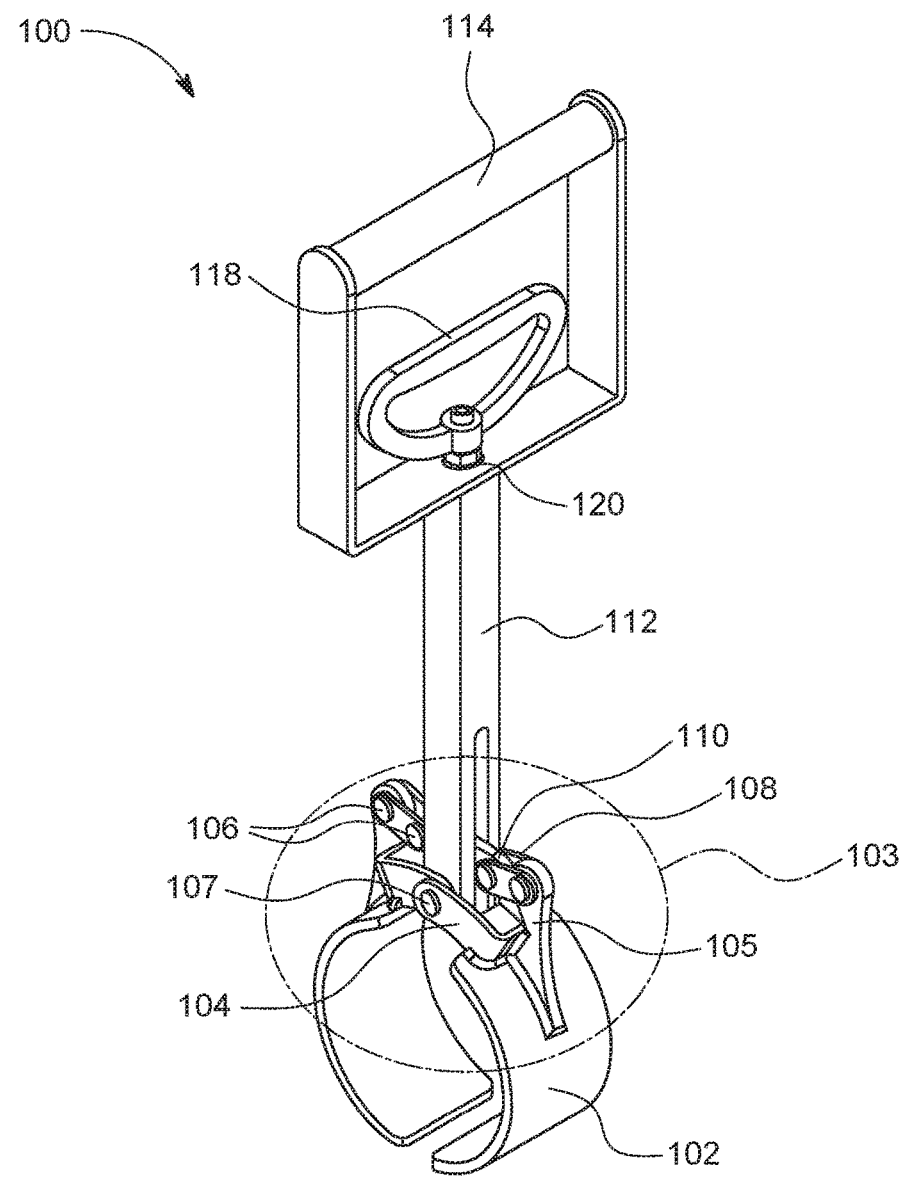
FIG. 1D is a three-quarter perspective view illustrating another tool (again, "grip tool") for gripping an object (e.g., a cylindrical object) (not illustrated), according to another embodiment of the present invention.

FIG. 1D is a three-quarter perspective view illustrating another tool (again, "grip tool") 100 for gripping an object (e.g., a cylindrical object) (not illustrated), according to another embodiment of the present invention, In FIG. 1D, grip tool 100 is illustrated in a closed (substantially) state. While not illustrated in either FIGS. 1A-1D, a cylindrical object to be gripped is illustrated, e.g., as object 201 in FIG. 2B, discussed below.

Figure 2A:
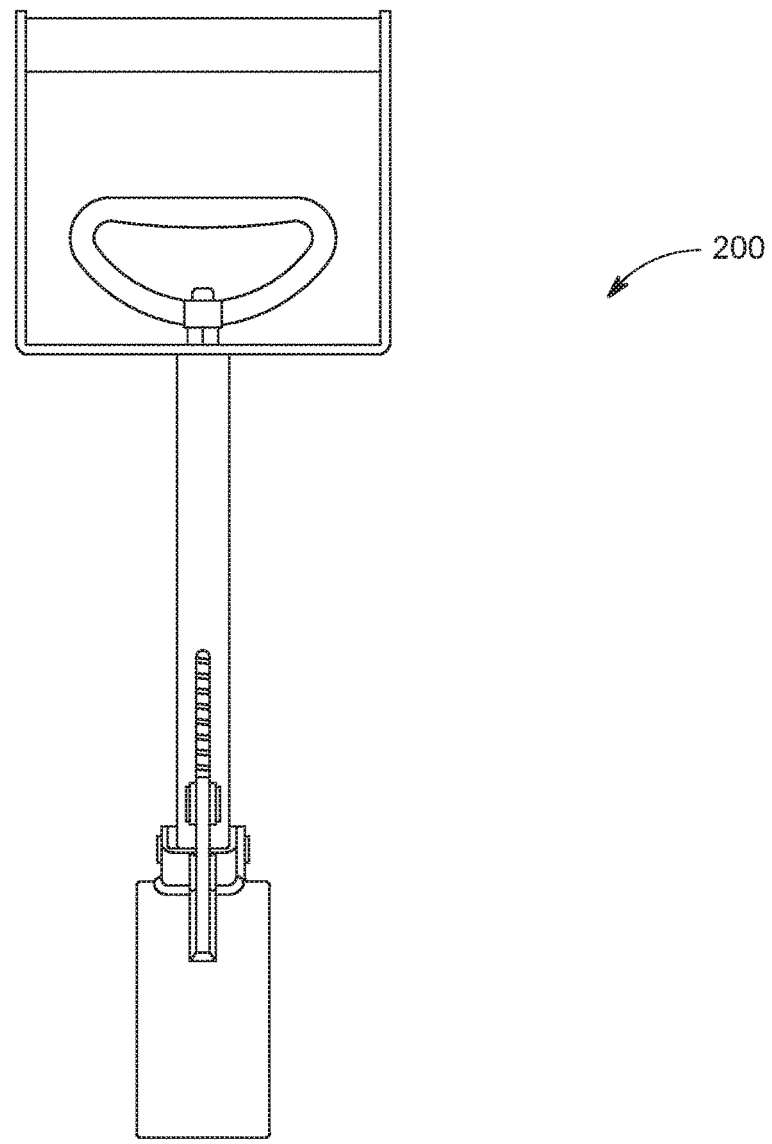
FIGS. 2A-2B are front and side elevation views illustrating another tool (again, "grip tool") for gripping an object (e.g., a cylindrical object) (not illustrated), according to another embodiment of the present invention, and FIG. 2B' is a simplified version of FIG. 2B.
Figure 2B:
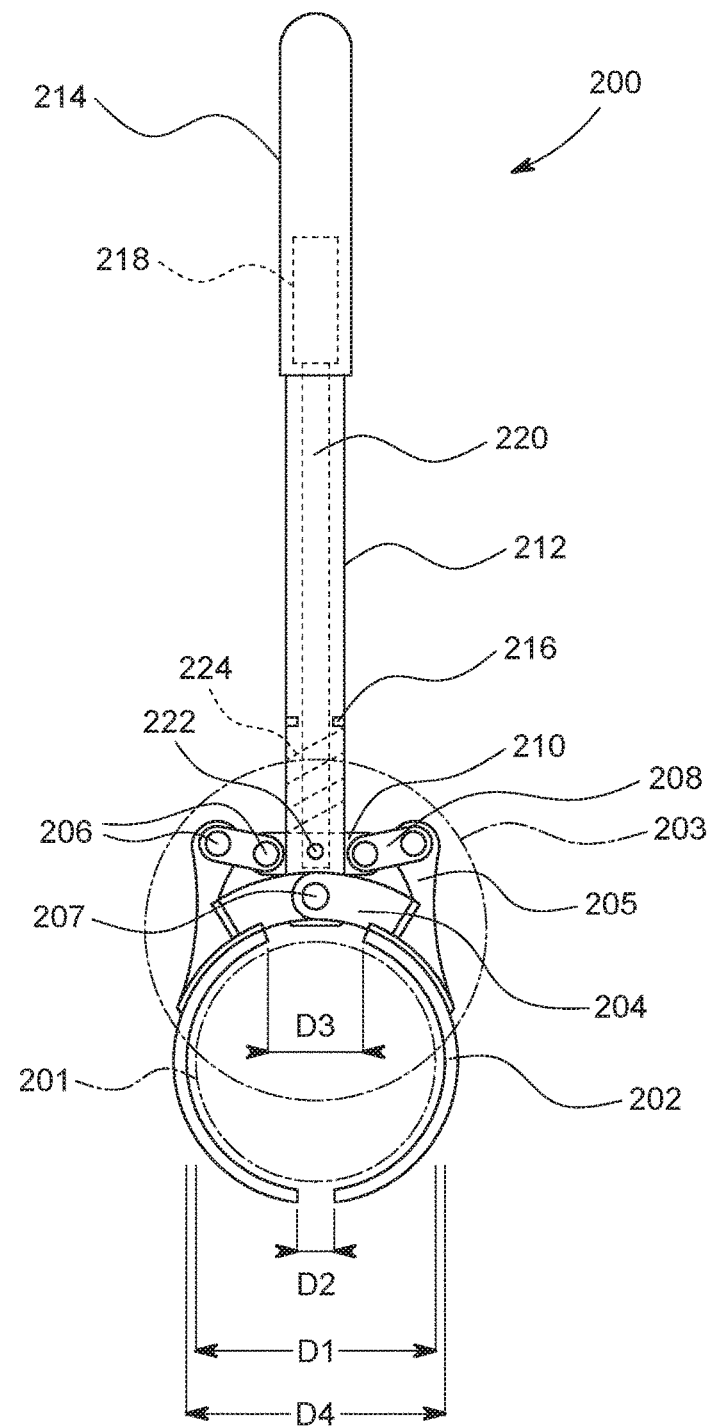
Figure 2B:
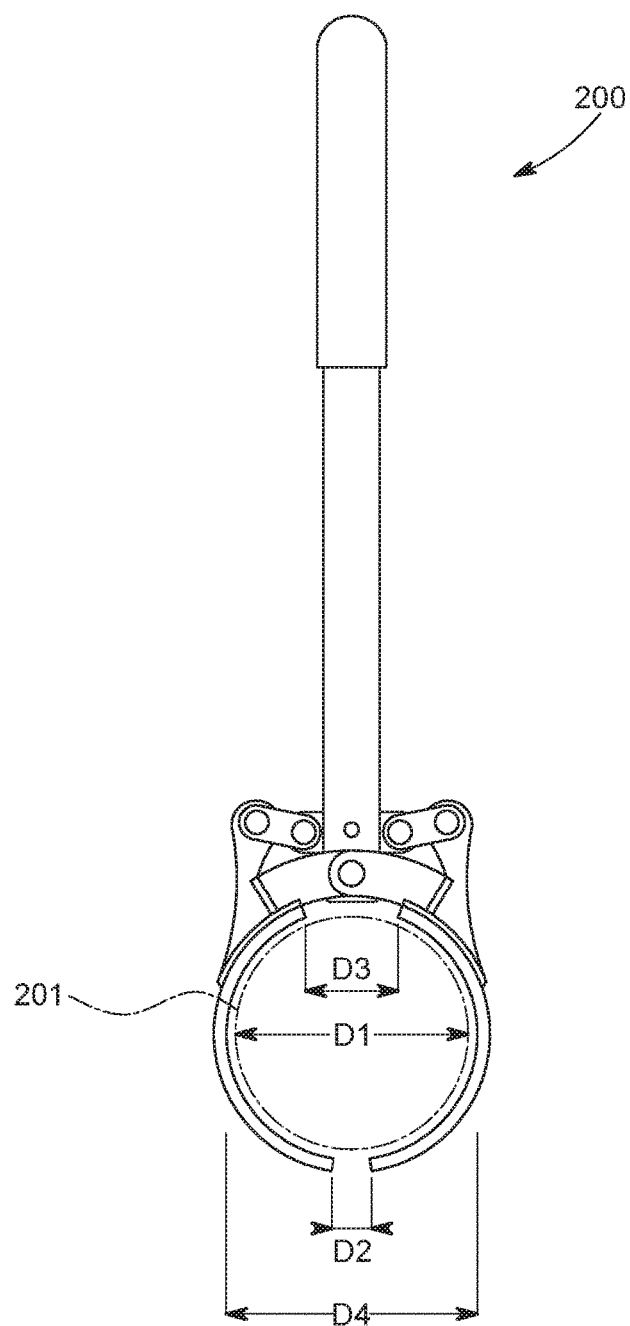

FIGS. 2A-2B are front and side elevation views, respectively, illustrating another tool (again, "grip tool") 200 for gripping an object (e.g., a cylindrical object having a diameter D1) 201, according to another embodiment of the present invention. FIG. 2B' is a simplified version of FIG. 2B.

In FIGS. 2A-2B, grip tool 200 is illustrated in a closed (substantially) state.

Grip tool 200 includes: an outer handle 218; a tubular neck 212 having a proximal end connected to outer handle 214; a linkage assembly 203 having first and second ends connected (e.g., via a connecting pin 207) to a distal end of neck 212; an inner handle 218; a connecting rod 220 having a proximal end connected to inner handle 214 and a distal end connected to a middle portion of linkage assembly 203, partially disposed substantially coaxially within neck 212 thereby nesting inner handle 218 within outer handle 214; first and second claws 202 attached to linkage assembly 203, each claw 202 having a concave cylindrical surface configured to conform as a substantial complement to a portion of an outer surface of the to-be-gripped cylindrical object. For example, each of first and second claws 202 is an annular-cylindrical segment.

Linkage assembly 203 includes: first and second u-shaped frames 204 representing the first and second ends of linkage assembly 203; a yoke 210 having a first end, and second end, and a middle portion connected to the distal end of connecting rod 220; first and second connecting members 208 having first ends connected to the first and second ends of yoke 210, respectively; and first and second coupling flanges 205 having first ends connected to second ends of first and second connecting members 208, respectively, and having second ends connected to first and second u-shaped frames 204, respectively. First and second claws 202 are connected to first and second u-shaped frames 204 and also are connected to the second ends of first and second coupling flanges 205, respectively.

In embodiments, many different mechanical linkages may be used to accomplish the same motion of opening and closing the claws. The exact design of the linkage assembly may affect the leverage ratio, or ratio of force applied to the claws to the amount of force applied by a user to the inner handle. A high leverage ration may allow for the use of a stronger bias towards a closed position for the claws, which allows for carrying heavier objects without the weight of the object forcing the claws open.

Grip tool 200 further can include: a biasing spring 224, e.g., a helical spring, disposed concentrically about connecting rod 220. Neck 212 can include one or more spring-stop flanges 216 against which a first end of spring 224 can abut. A second end of spring 224 can abut yoke 210. Biasing spring 224 can be sized, and spring-stop flanges 216 can be located, so as to dispose yoke 210 axially away from spring-stop flanges, thereby biasing grip tool 200 into the closed (substantially) state illustrated in FIGS. 2A-2B. Additional discussion of biasing spring 224 is provided in the context of FIGS. 3A-3C, discussed below. Biasing spring may be sized based on expected weight of objects to be carried, to avoid opening of the claws during use.

Each of claws 202 has substantially parallel first axial edges that are distal to linkage assembly 203. There is a distance D2 between the first axial edges. Each of first and second claws 202 are disposable through a range of positions relative to one another via relative coaxial movement between connecting rod 220 and neck 212 and consequential articulation of linkage assembly 203. The range of positions include: at least one closed position in which the D2<D1 (where, again, D1 is the diameter of the cylindrical object); and at least one substantially open position in which D1<D2.

Each of claws 202 has substantially parallel second axial edges that are proximal to linkage assembly 203. There is a distance D3 between the second axial edges. In the at least one substantially open position, D3<D2. In the at least one closed position, D2<D3.

Figure 2C:
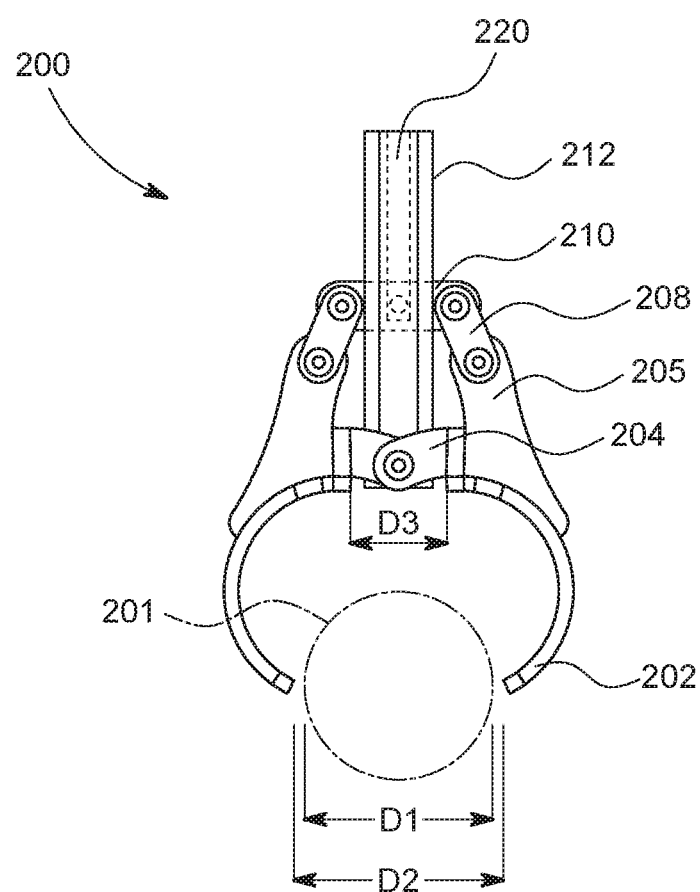
FIG. 2C is a side elevation view illustrating the grip tool of FIGS. 2A-2B in an open (substantially) state.

FIG. 2C is a side elevation view illustrating grip tool 200 in an open (substantially) state.

In FIG. 2C, the distance D2 between the first axial edges of claws 202 is greater than a diameter D1 of cylindrical object 201, D1<D2.

Figure 2D:
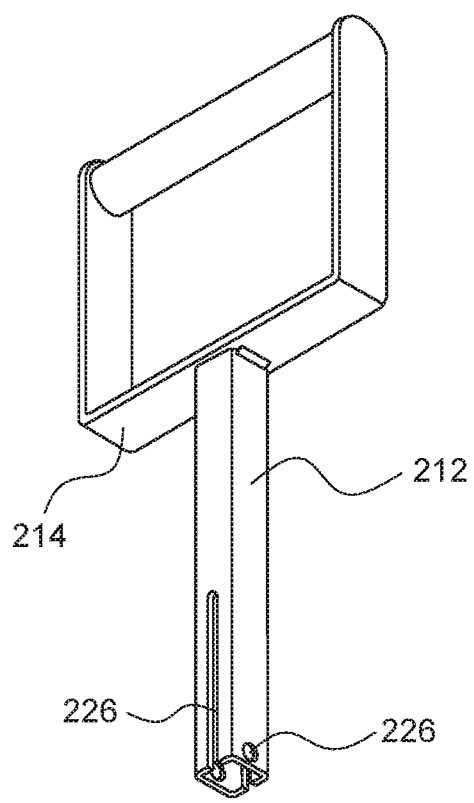
FIGS. 2D-2F are three-quarter perspective, front elevation and side elevation views, respectively, of the outer handle and the neck of the grip tool of FIGS. 2A-2B.
Figure 2E:
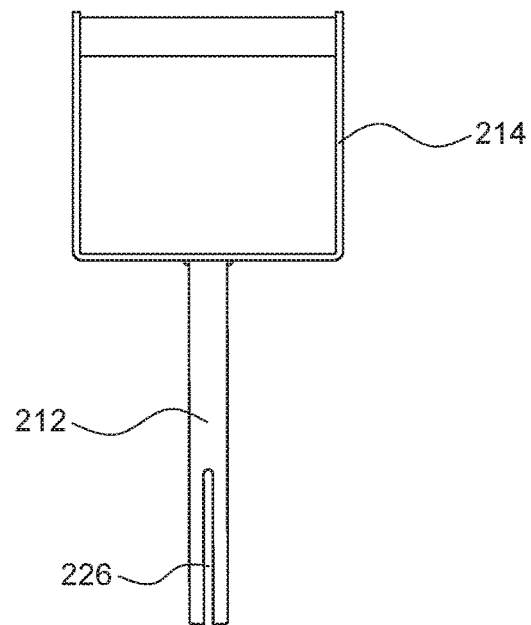
Figure 2F:
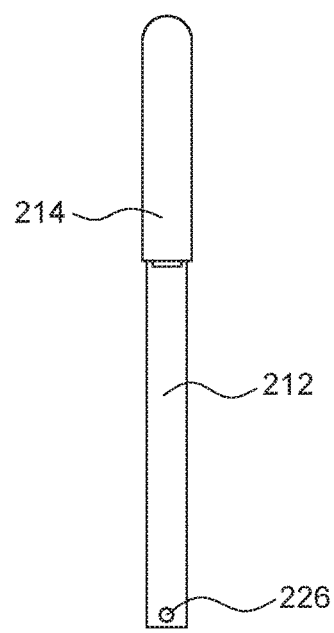

FIGS. 2D-2F are three-quarter perspective, front elevation and side elevation views, respectively, of outer handle 214 and neck 212.

In FIG. 2D, neck 212 includes yoke slots 226 and through-holes 226 configured to receive connecting pin 207.

Figure 2G:
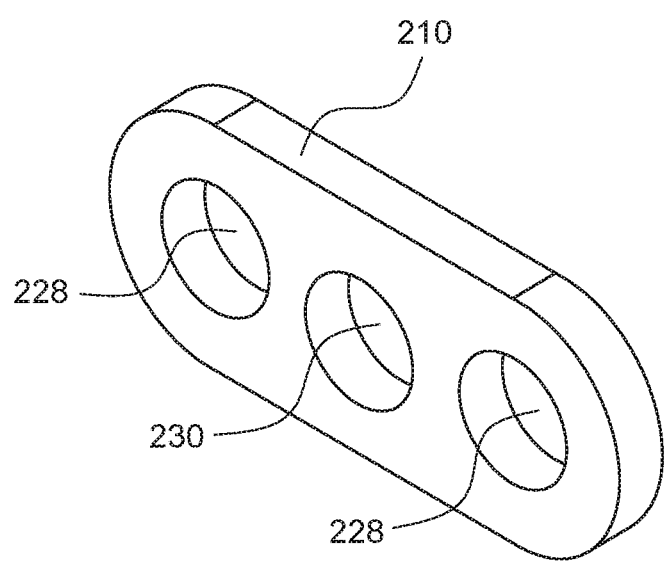
FIGS. 2G-2I are three-quarter perspective, front elevation and top views, respectively, of the yoke of the grip tool of FIGS. 2A-2B.
Figure 2H:
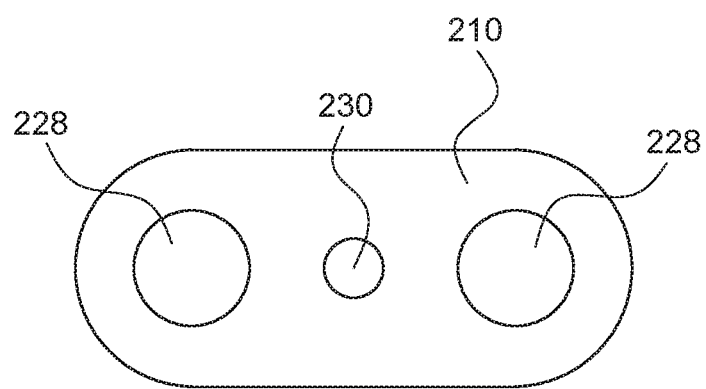
Figure 2I:
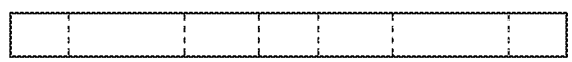

FIGS. 2G-2H are three-quarter perspective, front elevation and top views, respectively, of yoke 210.

In FIGS. 2G-2H, yoke 210 includes: through-holes 228 configured to receive connecting pins 206; and a through-hole 230 configured to receive a connecting pin 222.

Figure 2J:
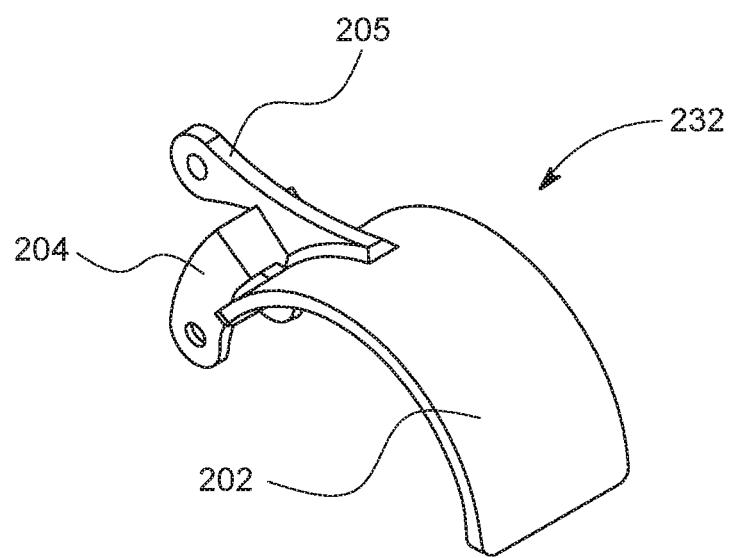
FIGS. 2J-2L are three-quarter perspective, top and side elevation vie respectively, of the claw assembly of the grip tool of FIGS. 2A-2B.
Figure 2K:
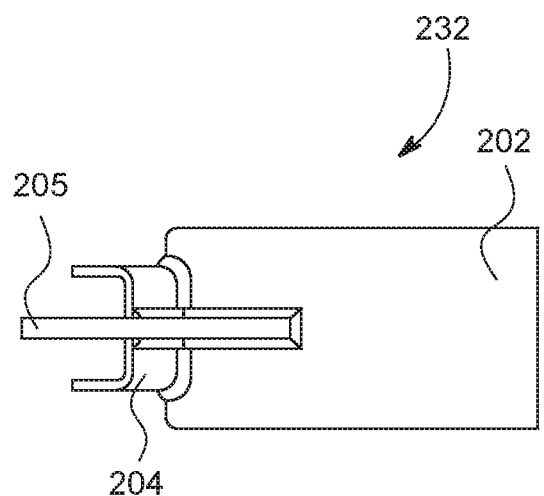
Figure 2L:
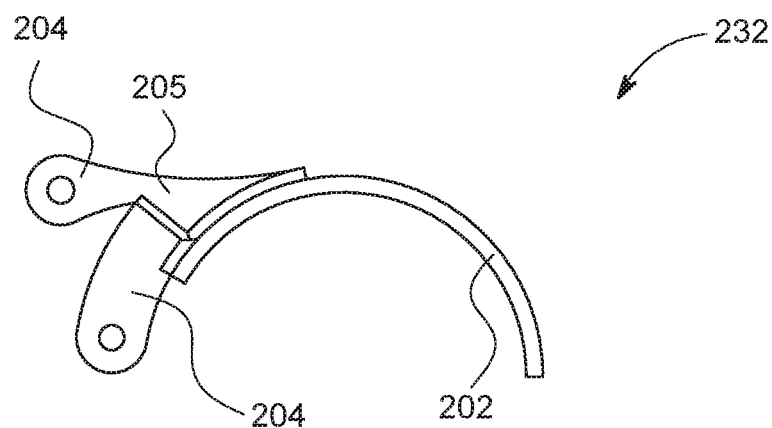
Figure 2M:
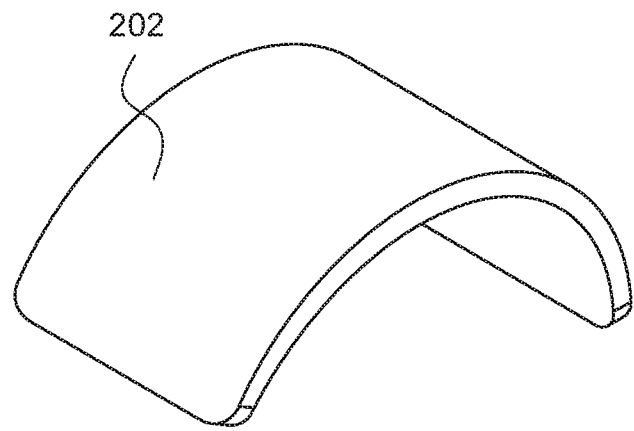
FIGS. 2M-2P are three-quarter perspective, side elevation, top and front elevation views, respectively, of the claw of the grip tool of FIGS. 2A-2B.
Figure 2N:
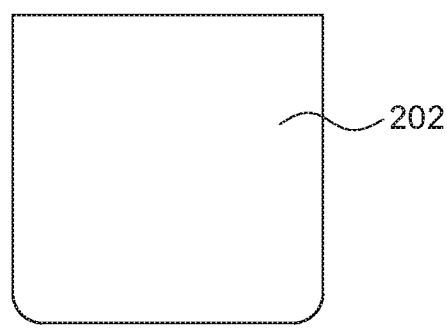
Figure 2O:
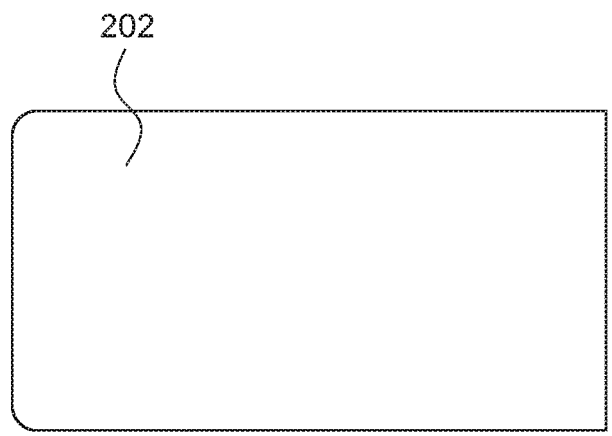
Figure 2P:
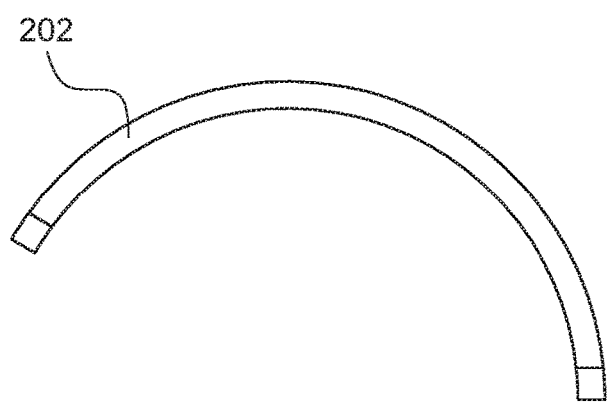

FIGS. 2J-2L are three-quarter perspective, top and side elevation views, respectively, of a claw assembly 232 of grip tool 200.

In FIGS. 2J-2J, claw assembly 232 includes u-shaped frame 204, flange 205 and claw 202. For example, claw assembly 232 can be formed as one integral unit, e.g., via welded joints in the circumstance that u-shaped frame 204, flange 205 and claw 202 are metal. Grip tool 200 includes a pair of (namely, two) claw assemblies 232. In particular, the pair of claw assemblies 232 is interchangeable with other pairs of claw assemblies 232 that have differently sized claws 202 (and possibly correspondingly differently sized flanges 205). When differently-sized pairs of claw assemblies 232 are provided, such interchangeability facilitates one instance of grip tool 200 being adaptively reconfigurable to accommodate objects of significantly different sizes via the mounting thereto of an appropriately sized one of the pairs of claw assemblies 232.

FIGS. 2M-2P are three-quarter perspective, side elevation, top and front elevation views, respectively, of claw 202.

Figure 2Q:
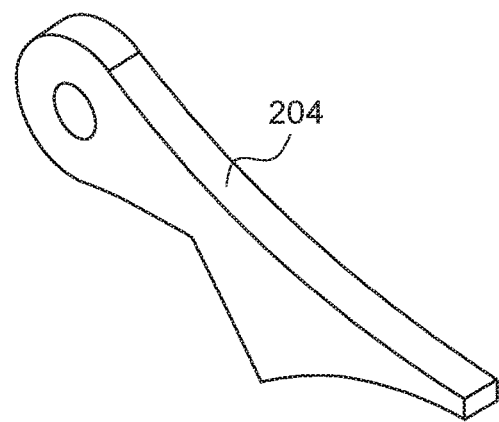
FIGS. 2Q-2S are three-quarter perspective, side elevation and front elevation views, respectively, of the coupling flange of the grip tool of FIGS. 2A-2B.
Figure 2R:
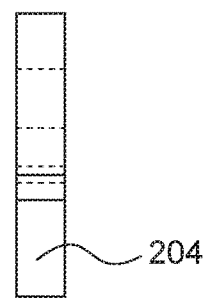
Figure 2S:
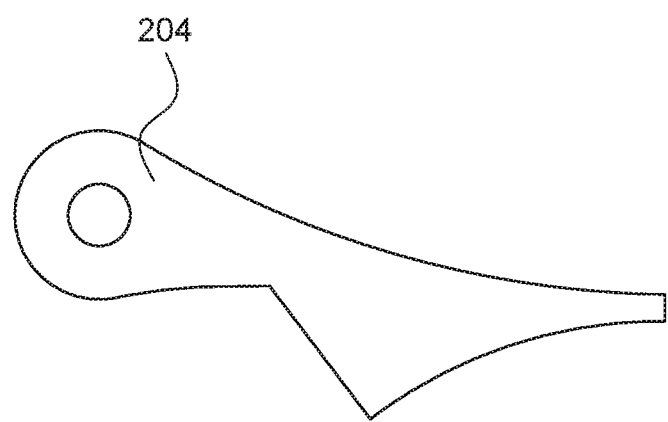

FIGS. 2Q-2S are three-quarter perspective, side elevation and front elevation views, respectively, of flange 205.

Figure 2T:
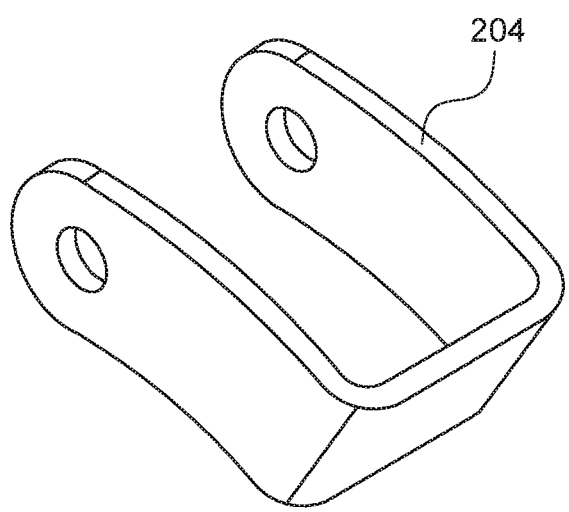
FIGS. 2T-2V are three-quarter perspective, top and side elevation views, respectively, of the u-shaped frame of the grip tool of FIGS. 2A-2B.
Figure 2U:
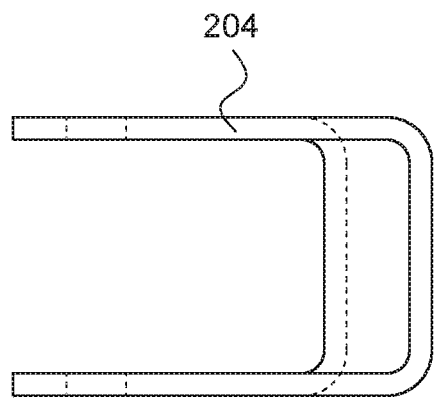
Figure 2V:
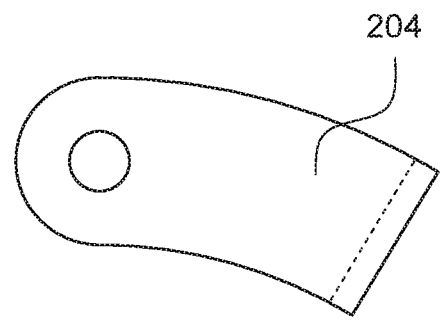

FIGS. 2T-2V are three-quarter perspective, top and side elevation views, respectively, of u-shaped frame 204.

Figure 3A:
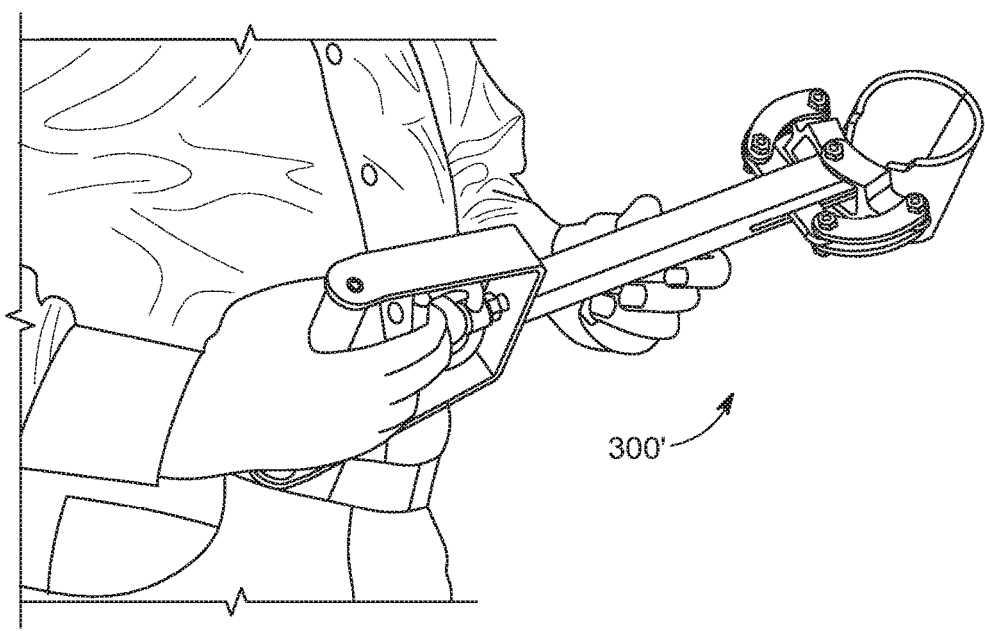
FIGS. 3A-3C are three-quarter perspective views illustrating a user operating another tool (again, "grip tool") (for gripping an object (e.g., a cylindrical object) (not illustrated)) to transition the grip tool through various states, in particular, a substantially closed state, a partially open state and a closed state, respectively, according to another embodiment of the present invention.
Figure 3B:
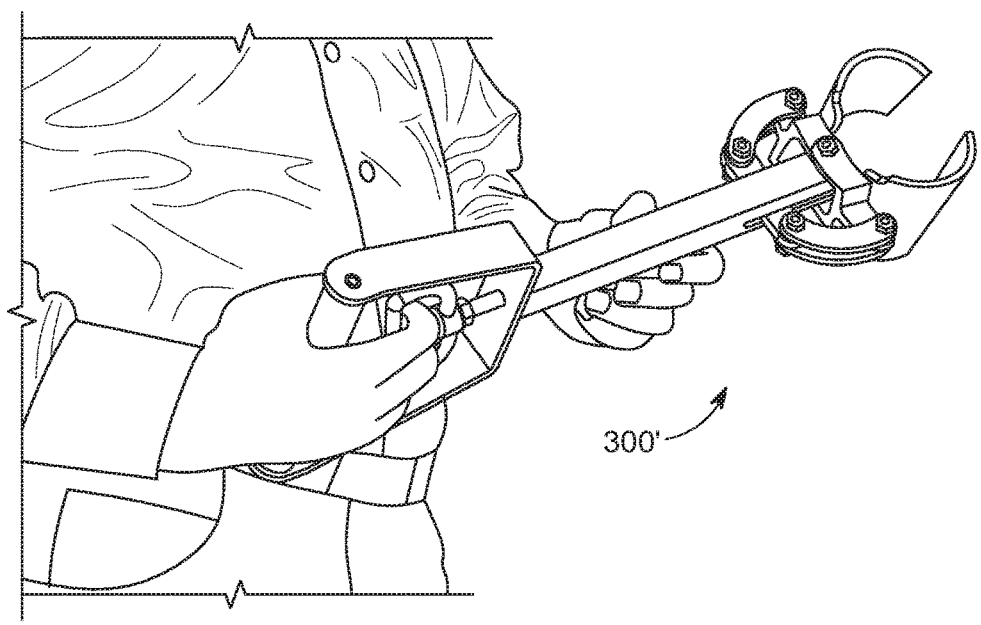
Figure 3C:
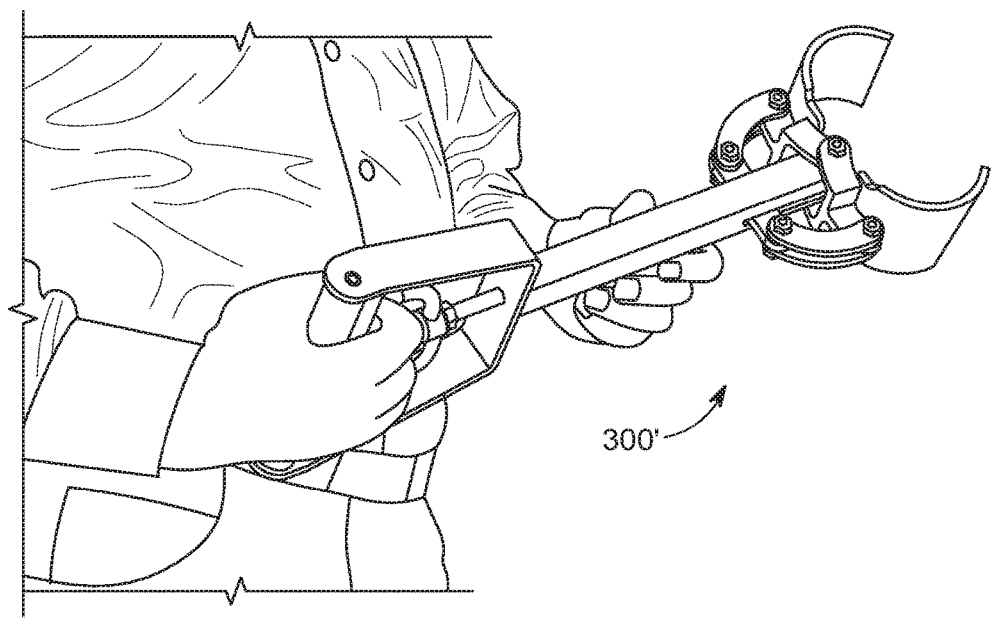
Figure 4:
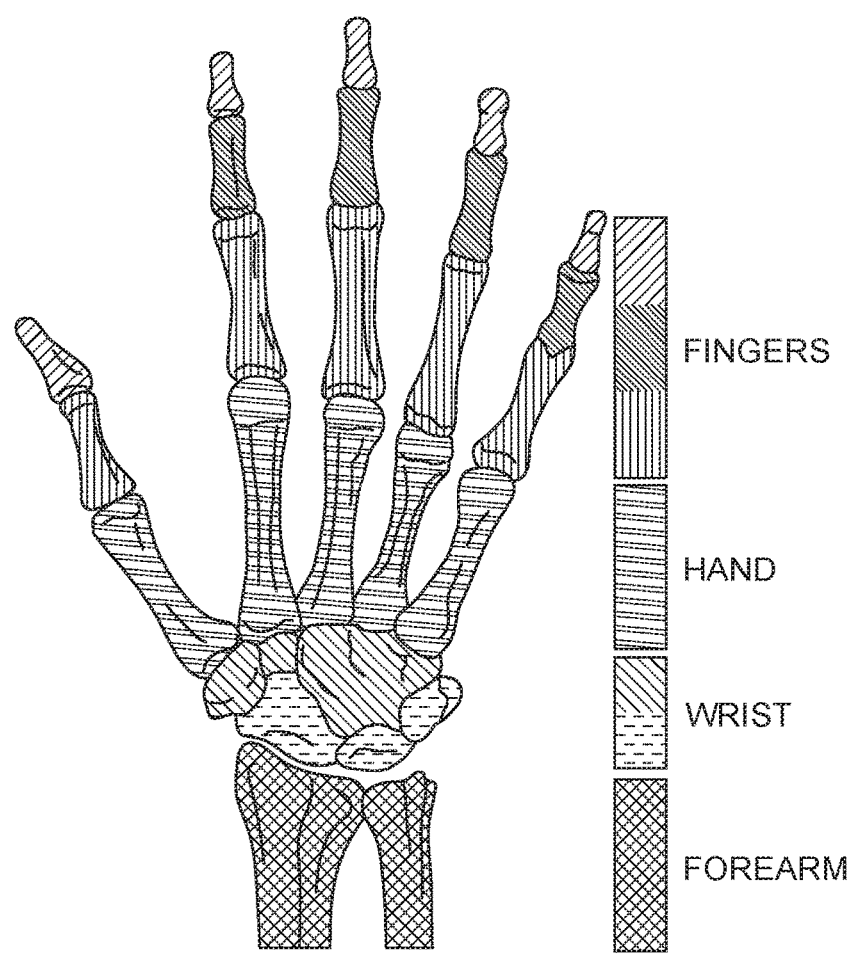
FIG. 4 is an illustration of the bones of the human hand.

FIGS. 3A-3C are three-quarter perspective views illustrating a user operating another tool (again, "grip tool") 300' (for gripping an object (e.g., a cylindrical object) (not illustrated)) to transition grip tool 300' through various states, in particular, a substantially closed state, a partially open state and a closed state, respectively, according to another embodiment of the present invention. Also, FIG. 4 is an illustration of the bones of the human hand.

Grip tool 300' is biased into the substantially closed, e.g., via biasing spring 224. To engage a cylindrical object (e.g., a pipe), the user must transition grip tool 300' from the substantially closed state (illustrated in FIG. 3A) into the substantially open state (illustrated in FIG. 3C) so that claws 202 can surround cylindrical object 201 as claws 202 are permitted to move towards the substantially closed state. To open claws 202 (assuming that grip tool 300' is in the substantially closed state illustrated in FIG. 3A), initially the user grasps grip tool 300' so that the proximal end of his palm (substantially corresponding to where the metacarpals meet the carpals—see FIG. 4) is disposed against outer handle 214 and the crook of his hand (between the first metacarpal (thumb) and second metacarpal (index finger)—again, see FIG. 4) is disposed partially around outer handle 214, and so that at least the distal phalanges (if not the middle phalanges (again, see FIG. 4), depending upon the size of the user's hand) of the fingers partially wrap around inner handle 218. Next, the user clenches the fingers as if attempting to make a fist, which draws inner handle 218 away from linkage 203 and towards the portion of outer handle 214 against which the proximal end of his palm is disposed, thereby opening claws 202 of grip tool 300', eventually transitioning grip tool 300' into the substantially open state illustrated in FIG. 3C.

Figure 5A:
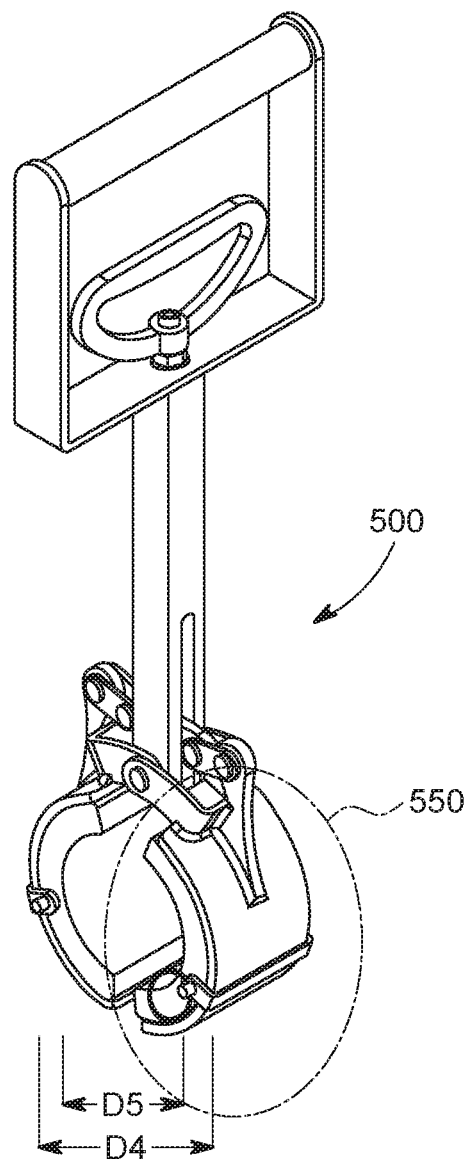
FIG. 5A is a three-quarter perspective view illustrating a tool (again, "grip tool") for gripping an object (e.g., a cylindrical object) (not illustrated), according to another embodiment of the present invention.

FIG. 5A is a three-quarter perspective view illustrating a tool (again, "grip tool") 500 for gripping an object (e.g., a cylindrical object) (not illustrated), according to another embodiment of the present invention. In FIG. 5A, grip tool 500 is illustrated in a closed (substantially) state.

Grip tool 500 is similar to grip tools 100 and 200 except that grip tool 500 further includes first and second shim assemblies 500 removably mounted against the interior surfaces of first and second claws 200, respectively, and configured to define a diameter D5 representing a maximum diameter of a cylindrical volume defined between first and second shim assemblies 550 when first and second claws 202 are disposed in a most closed position. By contrast, there is a diameter D4 representing a maximum diameter of a cylindrical volume defined between first and second claws 202 when first and second claws 202 are disposed in a most closed position.

Shim assemblies 550 decrease the effective grippable diameter of grip tool 500 because D5<D4. In other words, grip tool 500 is better configured to accommodate: a smaller diameter cylindrical object 201 when first and second shim assemblies 550 are mounted to first and second claws 202, respectively, and a larger diameter cylindrical object 202 when first and second shim assemblies 550 are not mounted to first and second claws 202, respectively. By varying the radial thickness of shims 552 (see discussion below), a user can vary D5 and thereby accommodate objects of different diameters. Claws that are larger in their closed inner diameter than the object to be held may allow significant movement of the object, depending on the object's geometry. The object may tilt, particularly up and down, and also slide forwards or backwards, particularly if tilted. Tilting may create large torques that significantly reduce the maximum weight that can be carried by a user. Wider claws, that extend longer in an axial direction of the object to be carried, may reduce the magnitude of possible tilting in situations where shims are not practical, such as the frequent changing of size of the objects to be carried. Selecting from a number of different grip tools, with different sized claws or shims, for each object to be carried can also address this problem.

Figure 5B:
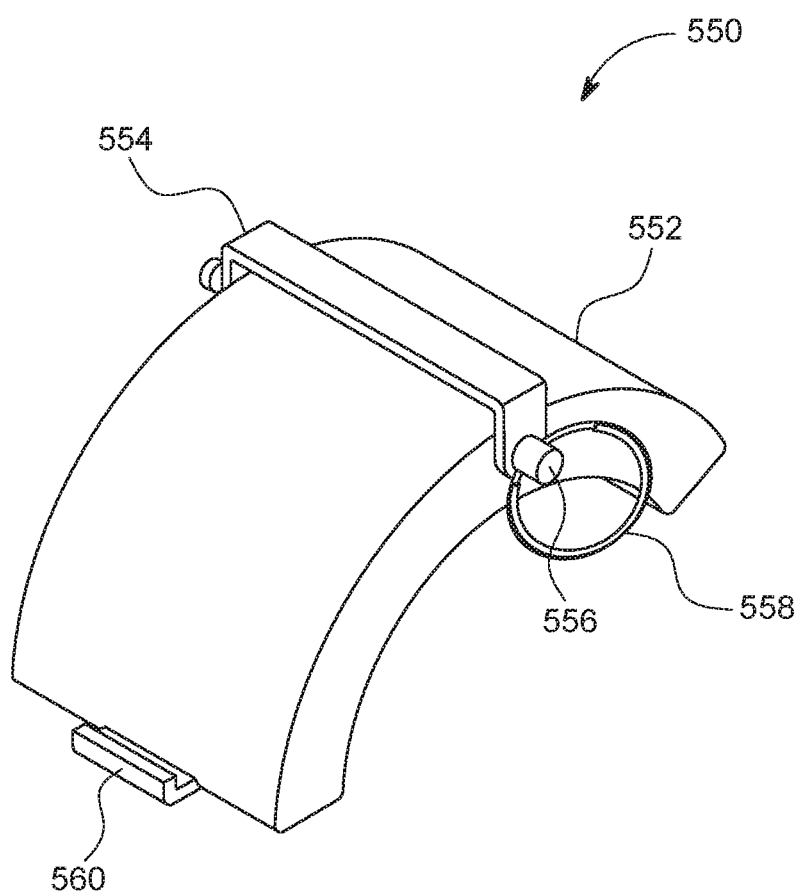
FIG. 5B is a three-quarter perspective view illustrating a shim assembly of the grip tool of FIG. 5A.

FIG. 5B is a three-quarter perspective view illustrating shim assembly 550, according to another embodiment of the present invention.

Figure 5C:
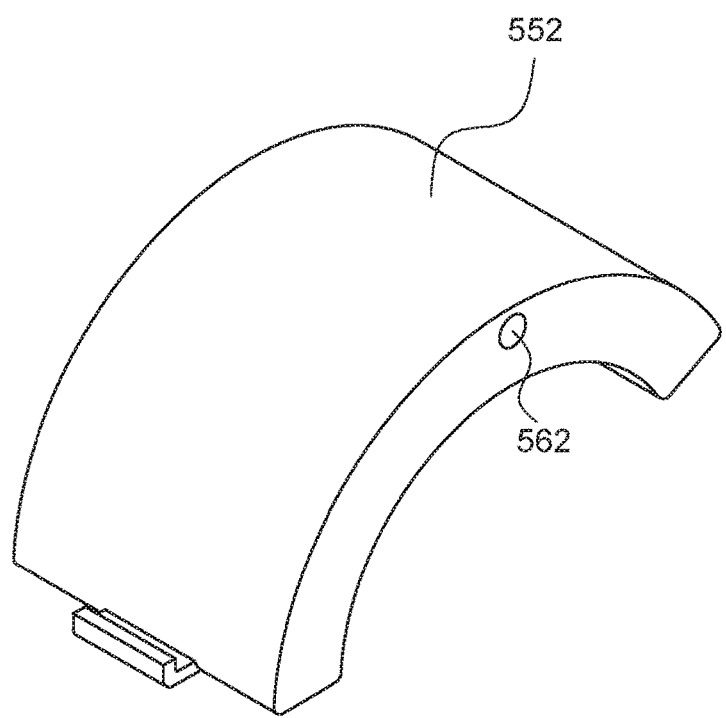
FIGS. 5C-5E are three-quarter perspective, side elevation and top views, respectively, of the shim of the grip tool of FIG. 5A.
Figure 5D:
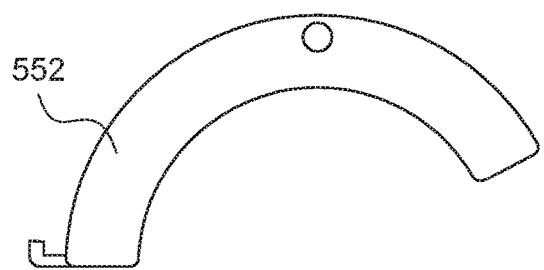
Figure 5E:
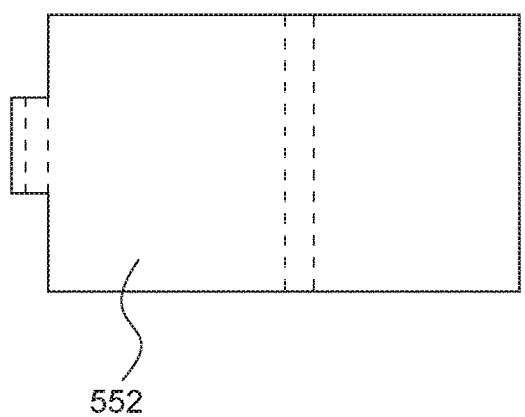

FIGS. 5C-5E are three-quarter perspective, side elevation and top views, respectively, of shim 55.

Figure 5G:
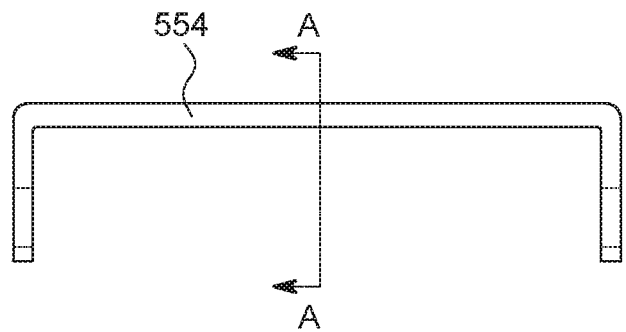
FIGS. 5F-5H are front elevation, three-quarter perspective and side elevation views, respectively, of the retaining member of the grip tool of FIG. 5A.
Figure 5F:
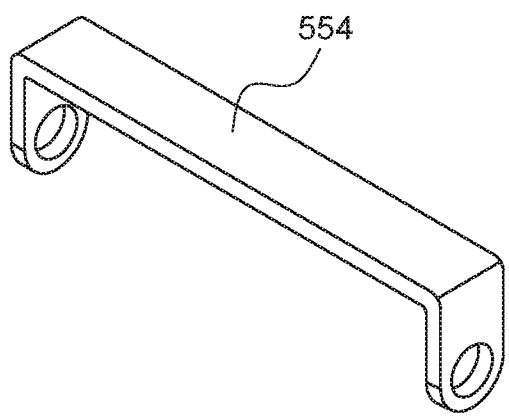
Figure 5H:
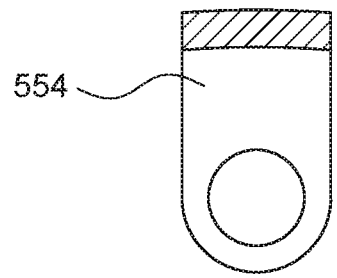

FIGS. 5F-5H are front elevation, three-quarter perspective and side elevation views, respectively, of retaining member 554.

In FIG. 5B, shim assembly 500 includes a shim 552 configured as an annular-cylindrical segment. Shim 552 has: first and second ends and a middle portion; a radially outward convex surface configured to conform as a substantial complement to the concave cylindrical surface of a corresponding one of first and second claws 202; and a radially inward concave cylindrical surface configured to conform as a substantial complement to a portion of an outer surface of to-be-gripped cylindrical object 201. There is an axial through-bore in the middle portion of shim 552. Shim assembly 500 also includes: a retaining member 554 having first and second ends in which are formed first and second through-holes, respectively, and which is removably disposable about the middle portion of shim 552 such that the first and second through-holes of retaining member 554 align with the through-bore of shim 552; a retaining pin 556 removably insertable through the first and second through-holes of retaining member 554 and through the through-bore of shim 552. Optionally, retaining pin 556 can be provided with a loop 558 to facilitate removal of pin 556 by a user.

Each shim 552 further can include: a retaining flange 560 mounted to the first end of shim 552 and configured to extend radially outward therefrom.

Returning briefly to FIGS. 1A-1D, linkage assembly 103 of grip tool 100 of FIG. 1D is similar to linkage assembly 203 of grip tool 200 of FIG. 2B. In contrast to linkage assembly 103 which includes coupling flanges 105 and linear connecting members 108, linkage assembly 103' of FIGS. 1A-1C does not include such coupling flanges, nor connecting members that are linear, but instead includes arcuate connecting members that are substantially longer than linear connecting members 108.

For ease of discussion and illustration, the embodiments of the grip tool disclosed herein have assumed, as an example, a cylindrical object having a substantially smooth outer surface as the shape of an object to be grasped. It is noted that substantially smooth cylindrical objects are but one of many object-shapes which can be gripped by appropriately configured corresponding embodiments of the present invention. Examples of other object-shapes include:

splined rods; splined tubes; prismatic objects, e.g., rectangular parallelepipeds (such as square tubing), elliptical prisms; I-beams, etc.

Embodiments of the grip tool disclosed herein are well suited to industries that include the manual labor of handheld manipulation (installation, conveyance, etc.) of pipes, tubes and/or rods. Examples of such industries include: pipe, tube and/or rod manufacture and distribution; irrigation; the oil & gas industry; plumbing; metal fabrication, etc. For example, such grip tools are configured to accommodate the various needs to manipulate pipes and/or tubes in the oil & gas industry.

Embodiments of the grip tool disclosed herein can be made from, e.g., a strong material that resists corrosion, e.g., stainless steel, aluminum, reinforced plastics, etc. The outer handle, e.g., outer handle 214, can be provided with an elastomeric surface, e.g., a rubber composite, having a chemical formulation that substantially maintains elasticity over a large range of ambient conditions encountered by workers, e.g., in the oil & gas industry, while being substantially resistant to the varieties of chemicals to which the grip is likely to be exposed in such an industry.

Embodiments of the grip tool disclosed herein can be provided in a variety of lengths, as measured from outermost end of outer handle 214 to the first axial ends of claws 202. Example lengths include 14" and 19". To better accommodate different tasks and/or work environments, claws 202 can be provided in various sizes so as to provide various diameters D4 of the cylindrical volume defined between first and second claws 202 when disposed in a most closed position. Example diameters of D4 include about 2"+⅜" and about 6"+⅝".

Embodiments of the grip tool disclosed herein exhibit strength and durability sufficient for such grip tools to grip and hold weights substantially in excess of typical maximum weights that a human user could support while using the grip tool. In other words, in a support 'chain' that includes the user and such a grip tool, the user is the 'weak link.' For example, depending upon its configuration, such a grip tool itself can grasp and support a pipe weighing at least 2000 pounds.

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A tool for gripping an object having a dimension (D1), the tool comprising:

an outer handle;
a tubular neck having a proximal end connected to the outer handle; a linkage assembly having first and second ends connected to a distal end of the neck;
an inner handle;
a connecting rod having a proximal end connected to the inner handle and a distal end connected to a middle portion of the linkage assembly, partially disposed substantially coaxially within the neck thereby nesting the inner handle within the outer handle;
first and second claws attached to the linkage assembly, wherein each of the claws having a surface configured to conform as a substantial complement to a portion of an outer surface of the to-be-gripped object;
wherein the surface of each of the first and second claws has a concave surface configured to conform as a substantial complement to a portion of an outer surface of the to-be-gripped object;
each of the claws has substantially parallel first edges that are distal to the linkage assembly, there being a first distance (D2) between the first edges of the two claws; and
the first and second claws are disposable through a range of positions relative to one another via relative coaxial movement between the connecting rod and the neck and consequential articulation of the linkage assembly, the range of positions including:
at least one closed position in which said first distance (D2)<said dimension (D1); and at least one substantially open position in which said dimension (D1)<said first distance (D2).

2. The tool of claim 1, wherein:
the object is a cylindrical object having said dimension (D1); and
the surface of each of the first and second claws has a concave cylindrical surface configured to conform as a substantial complement to a portion of an outer surface of the to-be-gripped cylindrical object.

3. The tool of claim 2, wherein:
each of the claws has substantially parallel second edges that are proximal to the linkage assembly, there being a second distance (D3) between the second edges of the two claws;
second distance(D3)<first distance (D2) in the at least one substantially open position; and
first distance (D2)<second distance (D3) in the at least one closed position.

4. The tool of claim 2, wherein:
each of the first and second claws is an annular-cylindrical segment.

5. The tool of claim 2, wherein:
there is a first diameter (D4) representing a maximum diameter of a cylindrical volume defined between the first and second claws when the first and second claws are disposed in a most closed position;
the tool further comprises:
first and second shim assemblies removably mounted against interior surfaces of the first and second claws, respectively, and configured to define a second diameter (D5) representing a maximum diameter of a cylindrical volume defined between the first and second shim assemblies when the first and second claws are disposed in a most closed position;
said second diameter (D5)<said first diameter (D4) in order to accommodate a smaller diameter cylindrical object with the first and second shim assemblies mounted.

6. The tool of claim 5, wherein each of the shim assemblies includes:
a shim configured as an annular-cylindrical segment, the shim having:
first and second ends and a middle portion; a radially outward convex surface configured to conform as a substantial complement to the concave cylindrical surface of a corresponding one of the first and second claws; and
a radially inward concave cylindrical surface configured to conform as a substantial complement to a portion of an outer surface of the to-be-gripped cylindrical object;
there being an axial through-bore in the middle portion of the shim;
a retaining member having first and second ends in which are formed first and second through-holes, respectively, and which is removably disposable about the middle portion of the shim such that the first and second through-holes of the retaining member are alignable with the through-bore of the shim; and
a retaining pin removably insertable through the first and second through-holes of the retaining member and through the through-bore of the shim.

7. The tool of claim 5, wherein each of the shim assemblies further includes:
a retaining flange mounted to the first end of the shim and configured to extend radially outward therefrom.

8. The tool of claim 1, wherein:
the tool further comprises:
first and second shim assemblies removably mounted against interior surfaces of the first and second claws, respectively, which act to increase the effective thickness of the first and second claws to accommodate smaller objects between the claws.

9. The tool of claim 8, wherein the first and second shim assemblies are concentric with the first and second claws, respectively.

10. The tool of claim 8, wherein the first and second shim assemblies have even thickness along their entire lengths.

11. The tool of claim 1, wherein the linkage assembly includes:
first and second u-shaped frames representing the first and second ends of the linkage assembly;
a yoke having a first end, a second end, and a middle portion connected to the distal end of the connecting rod;
first and second connecting members having first ends connected to the first and second ends of the yoke, respectively;
first and second coupling flanges having first ends connected to second ends of the first and second connecting members, respectively, and having second ends connected to the first and second u-shaped frames, respectively; and
the first and second claws are connected to the first and second u-shaped frames and also are connected to the second ends of the first and second coupling flanges, respectively.

12. The tool of claim 11, further comprising:
a biasing spring disposed concentrically about the connecting rod and having a first end and a second end, the first end abutting spring-stop flanges inside the tubular neck and the second end abutting the yoke, such that the biasing spring pushes the yoke axially away from the spring-stop flanges and thereby biases the tool into a substantially closed position.

13. The tool of claim 11, further comprising a yoke slot in the tubular neck, the yoke slot comprising parallel slots on opposite sides of the tubular neck positioned such that the yoke can move along the slot when forced by motion of the connecting rod.

14. The tool of claim 11, wherein each combination of one of the claws, corresponding u-shaped frames and corresponding coupling flanges comprises a claw assembly, wherein the u-shaped frames are connected to the tubular neck by a first removable connecting pin and wherein each of the coupling flanges is connected to one of the second connecting members by a second removable connecting pin, further comprising additional claw assembly having differently-sized claws for accommodating differently-sized objects to be carried, wherein the claw assemblies are interchangeable by removing the first and second connecting pins from a first claw assembly and insertion of the first and second connecting pins into a second claw assembly and the tubular neck and second connecting members, respectively.

15. The tool of claim 1, wherein the linkage assembly includes:
a yoke having a first end, a second end, and a middle portion connected to the distal end of the connecting rod;
first and second arcuate connecting members having first ends connected to the first and second ends of the yoke, respectively; and
first and second y-shaped frames representing the first and second ends of the linkage assembly and each connected at a first end to a corresponding one of the arcuate connecting members, at a second end to the tubular neck, and on a bottom side to corresponding one of the first and second claws.

16. A method of using the tool of claim 1, comprising:
moving the inner handle toward the outer handle, thereby opening the claws;
inserting an object between the claws;
moving the inner handle back towards the linkage assembly and away from the outer handle, thereby closing the claws around the object;
grasping the outer handle of the grip tool; and
lifting the grip tool together with the object.

17. The method of claim 16, wherein moving the inner handle toward the outer handle comprises grasping the grip tool so that a proximal end of a user's palm is disposed against the outer handle and a crook of the user's hand is disposed partially around the outer handle, and so that at least the distal phalanges of the fingers partially wrap around the inner handle, and clenching the user's fingers as if attempting to make a fist, drawing the inner handle away from the linkage assembly and towards a portion of the outer handle against which the proximal end of the user's palm is disposed, thereby opening the claws and transitioning the grip tool from a substantially closed state into a substantially open state;
wherein moving the inner handle back towards the linkage assembly and away from the outer handle comprises relaxing the user's fingers and allowing the inner handle to move back towards the linkage assembly and away from the portion of the outer handle against which the proximal end of the user's palm is disposed.

* * * * *